Feb. 17, 1942.   A. E. LARSEN   2,273,051
CONTROL SYSTEM FOR AIRCRAFT HAVING SUSTAINING ROTORS
Filed May 23, 1938   4 Sheets-Sheet 1
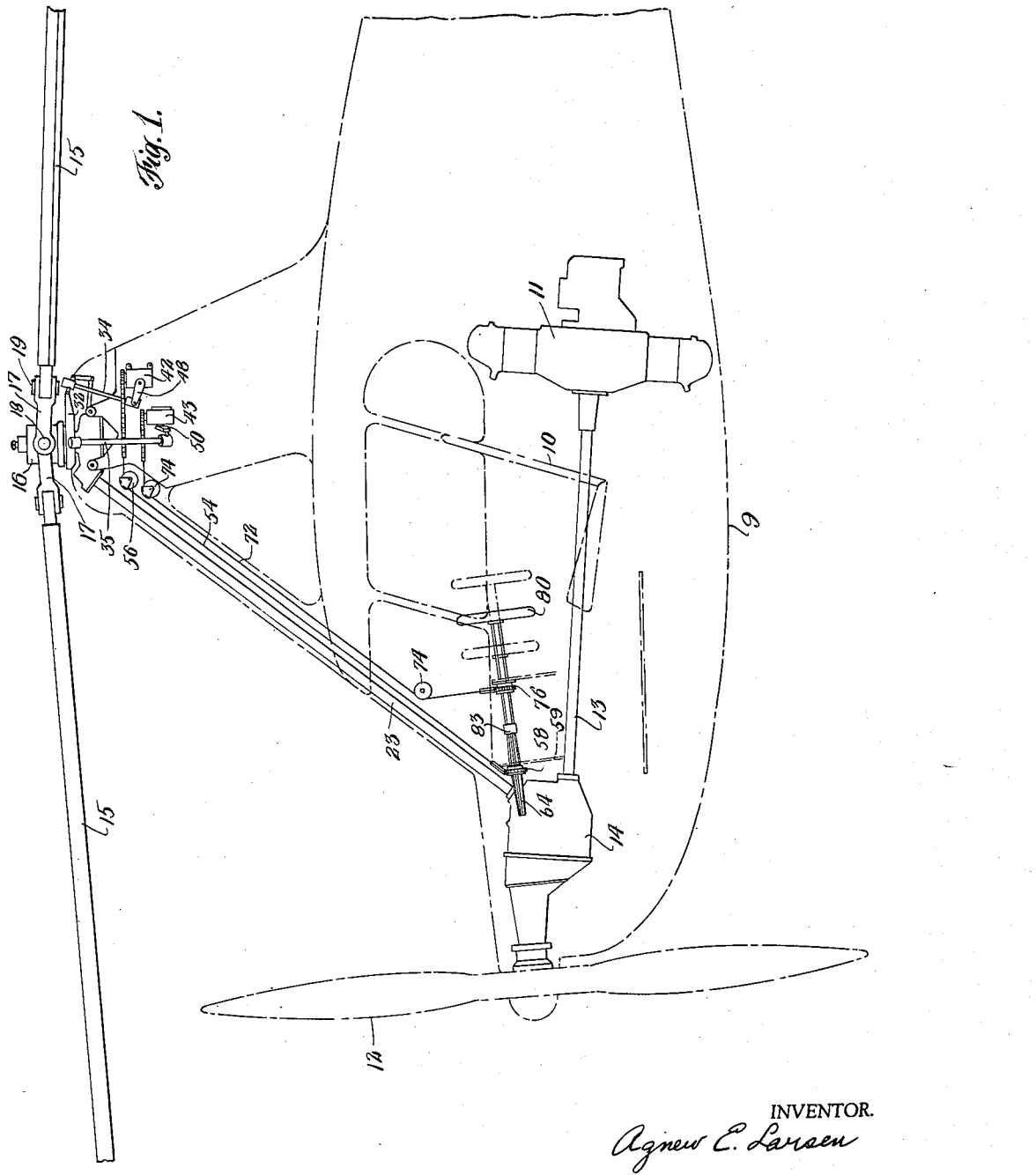
INVENTOR.
Agnew E. Larsen
BY
Synnestvedt & Lechner
ATTORNEYS.

Feb. 17, 1942.     A. E. LARSEN     2,273,051
CONTROL SYSTEM FOR AIRCRAFT HAVING SUSTAINING ROTORS
Filed May 23, 1938     4 Sheets-Sheet 2
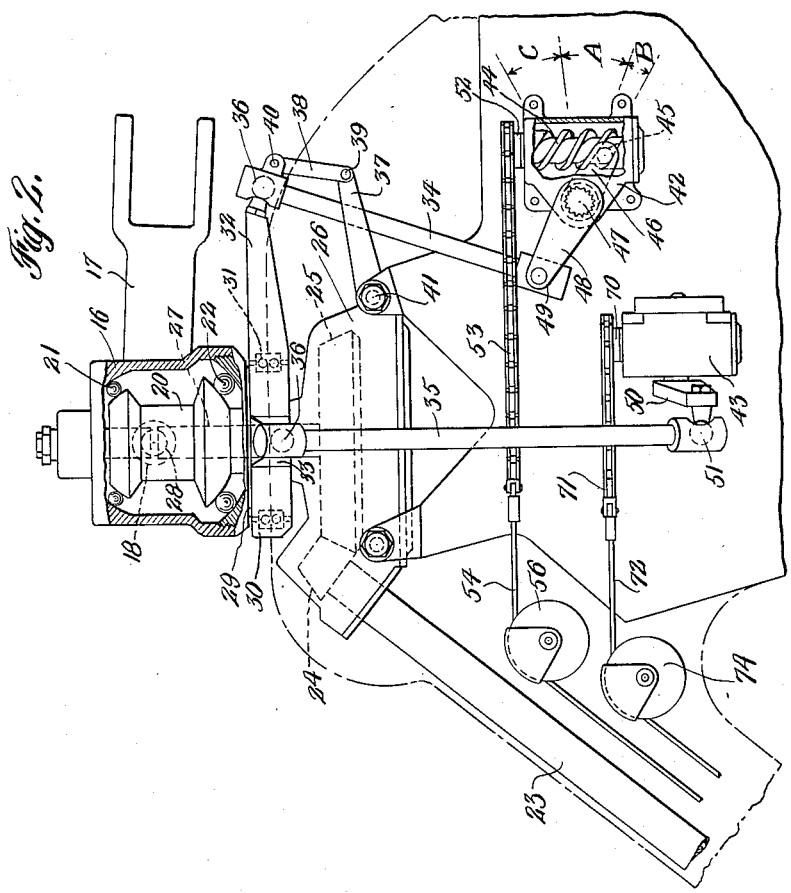
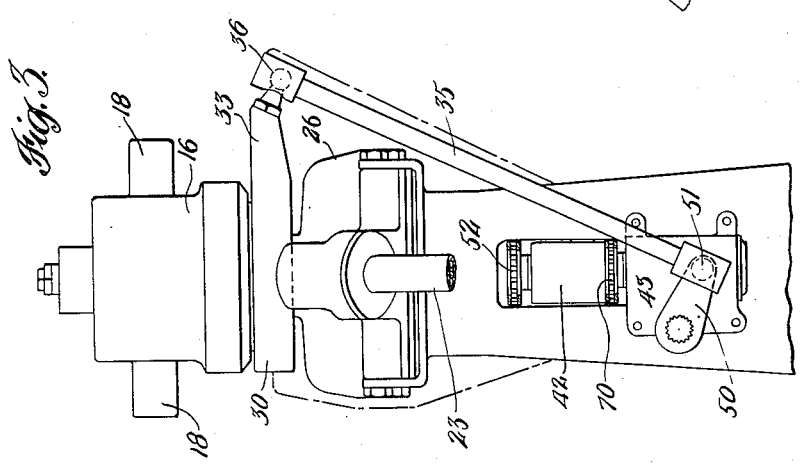
INVENTOR.
Agnew E. Larsen
BY
Synnestvedt & Lechner
ATTORNEYS.

Feb. 17, 1942.  A. E. LARSEN  2,273,051
CONTROL SYSTEM FOR AIRCRAFT HAVING SUSTAINING ROTORS
Filed May 23, 1938  4 Sheets-Sheet 3
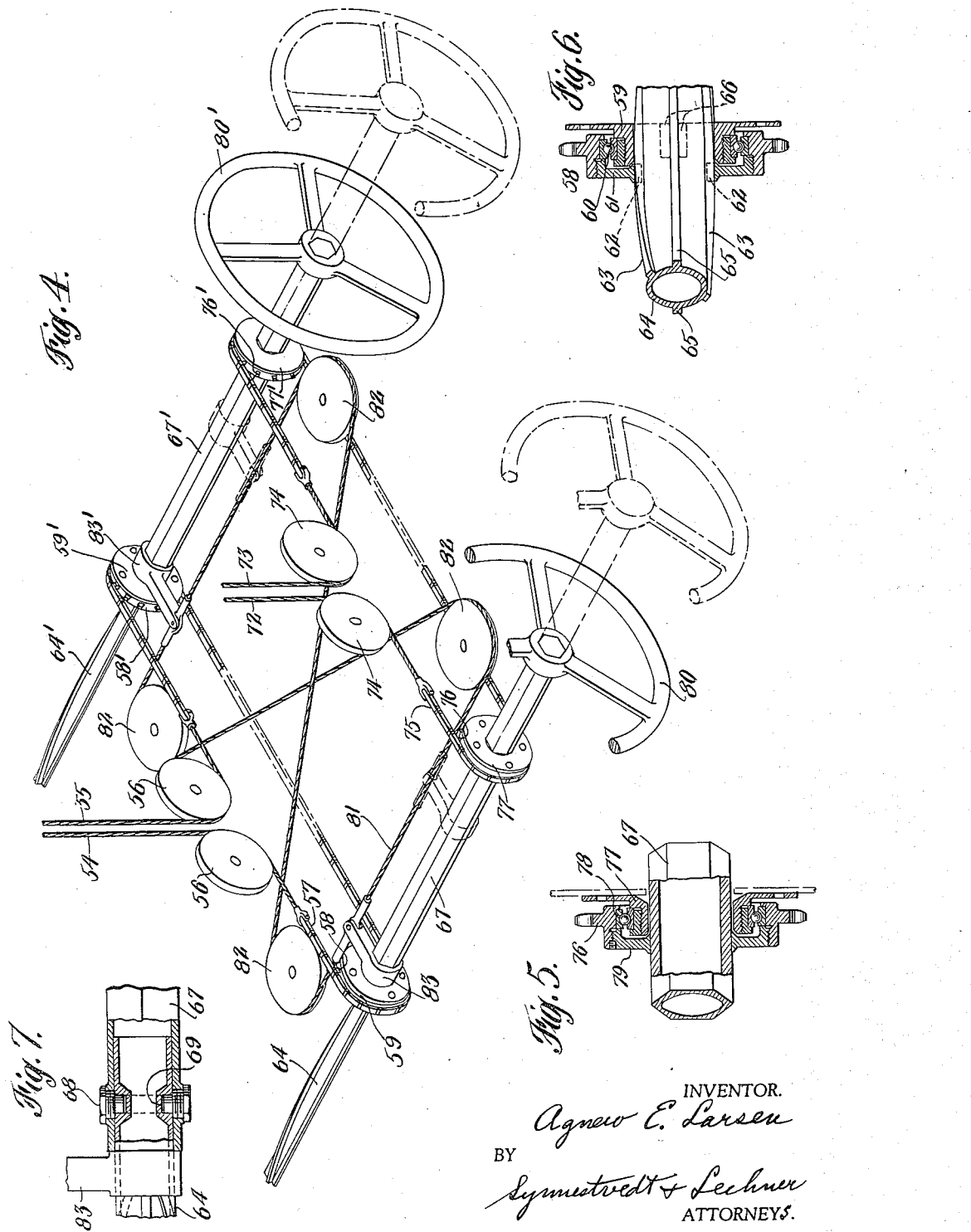
INVENTOR.
Agnew E. Larsen
BY
Synnestvedt & Lechner
ATTORNEYS.

Feb. 17, 1942.  A. E. LARSEN  2,273,051
CONTROL SYSTEM FOR AIRCRAFT HAVING SUSTAINING ROTORS
Filed May 23, 1938  4 Sheets-Sheet 4
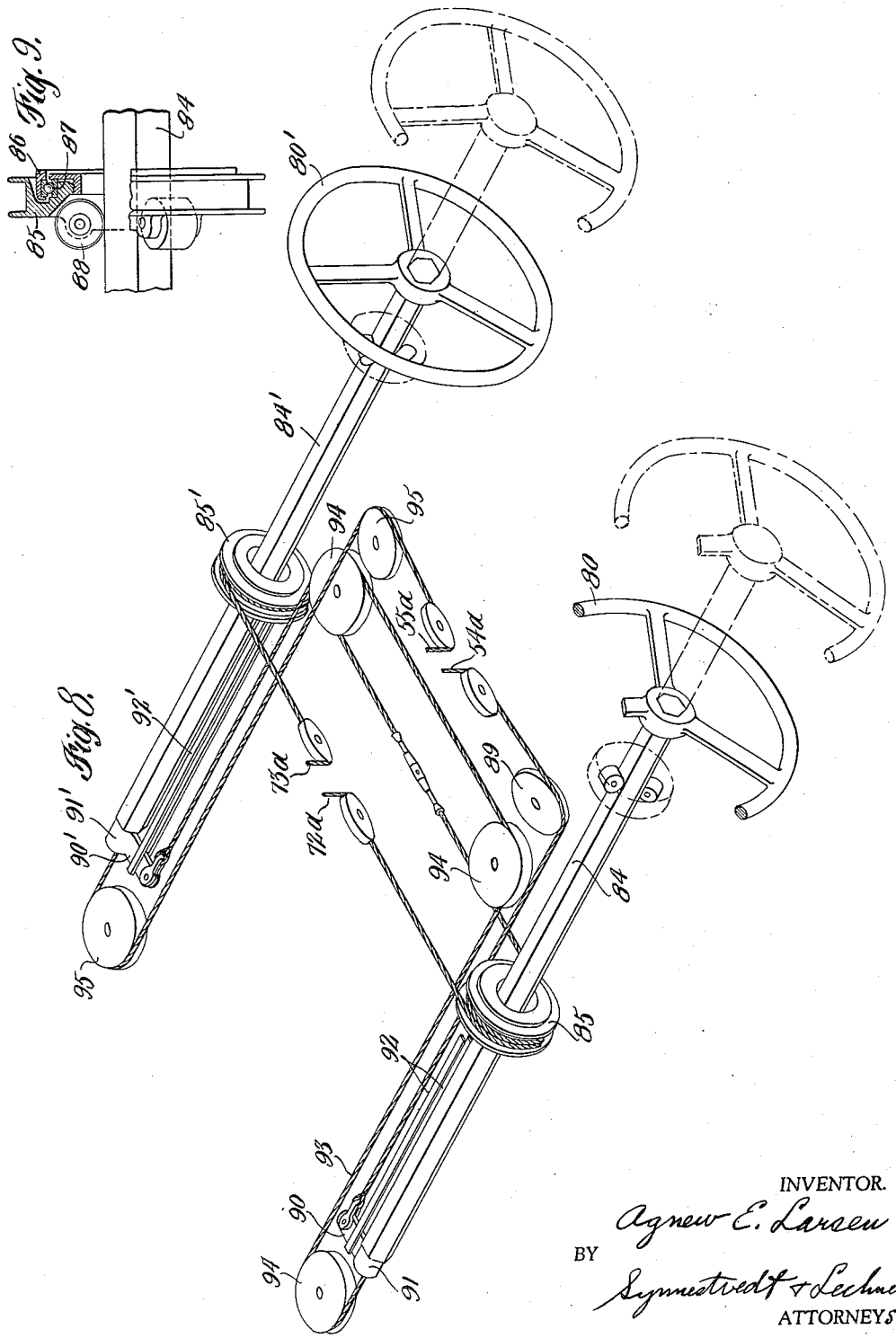
INVENTOR.
Agnew E. Larsen
BY
Synnestvedt & Lechner
ATTORNEYS Patented Feb. 17, 1942

2,273,051

UNITED STATES PATENT OFFICE 2,273,051

CONTROL SYSTEM FOR AIRCRAFT HAVING SUSTAINING ROTORS

Agnew E. Larsen, Jenkintown, Pa., assignor, by mesne assignments, to Autogiro Company of America, a corporation of Delaware Application May 23, 1938, Serial No. 209,511

16 Claims. (Cl. 244—18)

This invention relates to a control system for aircraft having a sustaining rotor. The invention, moreover, is particularly useful in an aircraft of this general type in which the sustaining rotor is capable of autorotational actuation in flight, or at least for purposes of descent without power. Furthermore, the invention is particularly concerned with a craft of this type in which the control moments are developed by movement of the rotor blades so as to shift the lift line of the rotor with respect to the center gravity of the craft, especially where such rotor blade movement is effected by tilting the hub on which the blades are mounted.

As to at least many features of the invention, my improved control system is especially applicable to the type of sustaining rotor in which the blade or blades are articulated to or pivotally mounted on a rotative hub, the pivot means including for each blade at least one pivot axis providing freedom for blade swinging movements generally transverse the mean rotative path of travel, whereby to compensate for differential lift effects in translational flight.

One of the primary objects of the invention is the provision of a control system for a sustaining rotor of the character hereinbefore mentioned, which control system is not only simple and reliable but, further, has characteristics improving the "feel" of the control in the operator's hand, while giving the operator a substantial mechanical advantage in effecting control displacements.

The control system of the invention further provides greater mechanical advantage for the operator or pilot in effecting control displacements in an intermediate portion of the control range as compared with the end portions of that range. Thus the control is "easier" in the central portion of the control range, which is of advantage in avoiding excessive fatigue, and at the same time in the end portions of the control range, relatively rapid response to movements of the control organ is afforded, whereby to facilitate quick maneuvering.

In addition to the above, the control system has limited "reversibility," i. e., the control system provides freedom for limited transmission of displacement forces originating in the rotor back to the manually operable control organ. Preferably the freedom for reverse transmission of forces through the control system is greater in the end portions of the control range than in the central portion thereof above referred to. Thus the control is more sensitive for quick maneuvering and at the same time, during normal flight (in the mid portion of the control range), transmission to the pilot's control of blade displacement forces originating in the rotor is kept at a somewhat lower value.

In addition to the above, the invention provides a control system incorporating a manually operable control wheel which is so coupled with the rotor that rotation of the wheel effects shift of the rotor lift line in the lateral sense, and that upon axial displacement of the wheel in a generally fore and aft direction, the rotor lift line is shifted in the fore and aft sense. In this way an "instinctive" control is provided which is exceptionally easy to operate and which has the further advantage of being unusually easy for the novice.

In accordance with another aspect of the invention, dual control wheels are provided, the two wheels being intercoupled and connected with the rotor in a simple and effective fashion.

Still further, the invention is of advantage in certain structural aspects of the control system, especially by virtue of the fact that provision is made for the use of tension elements such as cables extending throughout the major portion of the distance from the control organ in the body of the craft to the rotor head, at which point a motion conversion device is employed, comprising worm thread and worm thread follower elements, control connections being extended therefrom to the rotor itself, these latter connections being in the form of push-pull members in the tiltably mounted type of hub with which, as aforesaid, the invention is especially useful.

The motion conversion devices just referred to are constructed to give the mechanical advantage hereinbefore mentioned (to different degrees in different portions of the control range) and also to afford the partial or limited reversibility contemplated by this invention.

How the foregoing objects and advantages, together with others which will occur to those skilled in the art, are obtained will appear more fully from the following description referring to the accompanying drawings, in which—

Figure 1 is a somewhat diagrammatic outline view of a portion of an aircraft of the type here under consideration, with the improved control system of the present invention applied thereto;

Figure 2 is a similar enlarged view of the rotor head assembly of Figure 1, with certain portions broken out and shown in vertical section;

Figure 3 is a front elevational view of the mechanism appearing in Figure 2;

Figure 4 is an enlarged isometric view of the dual control wheels and associated parts of the arrangement of Figures 1 to 3;

Figures 5, 6 and 7 are detail sectional views of certain parts of the mechanism shown in Figure 4;

Figure 8 is a view similar to Figure 4 but illustrating a modification of the dual control wheel portion of the mechanism and the connections associated therewith; and Figure 9 is a detail view of a part of the mechanism of Figure 8.

At the outset of this description it is pointed out that while at least most features of the invention are applicable to rotors incorporating blades which are movable on the rotor hub to effect control (as in copending application of Juan de la Cierva, Serial No. 698,372, filed November 16, 1933), the invention is especially suitable to and is illustrated herein as applied to the type of rotor in which the hub itself is tiltably mounted to effect control, an example of such tiltably mounted hub being fully described in copending application of Juan de la Cierva, Serial No. 645,985, filed December 6, 1932.

It may here further be noted that a number of features of the particular form of rotor hub herein disclosed form no part of the present invention per se, but are fully described and claimed in my copending application, Serial No. 271,841, filed May 5, 1939, and issued December 2, 1941, as Patent No. 2,264,942.

Referring first to Figures 1, 2 and 3, the forward portion of the body of an aircraft of the type under consideration is indicated in dot and dash lines 9. The body is provided with a cabin in which a pilot's seat 10 is arranged, and in accordance with the general arrangement of copending application of Pitcairn, Ray and Larsen, Serial No. 14,304, filed April 2, 1935, issued October 3, 1939, as Patent No. 2,174,946, an engine 11 is disposed rearwardly of the occupant's compartment, the engine driving an air screw 12 for forward translation through the medium of drive shaft 13 and transmission mechanism housed within the gear box 14.

As here shown, the rotor incorporates two blades 15—15 which are pivotally connected with the rotative hub member 16 by means of blade mounting forks 17 embracing the hub and connected therewith by means of a pair of aligned trunnions 18—18 constituting a "flapping" or delta pivot axis. Each blade is connected to its mounting fork by means of a "drag" or alpha pivot 19, the flapping and drag pivots respectively providing freedom for blade oscillation generally transverse and within the rotative path of travel.

In accordance with my copending application above referred to, the hub 16 is both tiltably and rotatably mounted on the fixed spindle 20 by means of spherical bearings 21 and 22, freedom being thus provided for shifting of the lift line of the rotor in all directions so as to effect control of the craft in pitch and roll.

While the features of the invention hereinafter described are also applicable to the type of craft which is capable of direct or jump take-off (for example, as shown in copending application of Juan de la Cierva, Serial No. 738,349, filed August 3, 1934), for the sake of simplicity pitch change mechanism for jump take-off is not herein illustrated. It will be understood, however, that driving of the rotor prior to take-off is of advantage in any event so as to attain substantial rotor speed prior to leaving the ground. The driving mechanism shown includes a drive shaft 23 extended upwardly and rearwardly from the gear box 14, the shaft 23 carrying a pinion 24 meshing with the ring gear 25 mounted within the casing 26 and driving an upwardly extending shaft 27 which is universally jointed at 28 concentrically with hub mounting bearings 21 and 22. This drive shaft 27 at its upper end is connected with the rotative hub 16.

The rotative hub 16 has a downwardly extending portion 29 surrounded by a non-rotative ring 30, a bearing 31 being interposed between these two members.

Ring 30 is provided with a pair of arms 32 and 33, the first of which projects rearwardly from the rotor head and the second laterally, the two being generally at right angles to each other and constituting the means through which the hub is tilted in all directions for control purposes.

The arm 32 is associated with the upper end of push-pull member 34 and a similar member 35 is provided for the arm 33, each push-pull member being coupled with its associated arm by means of a universal 36.

In order to prevent rotation of ring 30 with the rotor and yet to permit free tilting thereof, a scissors linkage incorporating link elements 37 and 38 pivotally interconnected at 39, is connected at one end to the outside universal joint member 36 associated with the lever 32, and at its other end with a fixed part of the hub or support therefor. Both ends of this linkage are, of course, pivotally attached at the end points 40 and 41 and the pivots, especially at the point 41, preferably have substantial axial length so as to effectively maintain the proper position of the control members about the axis of the hub under all conditions including times of operation of the control in one plane when the other is displaced from the mid position.

The lower ends of the push-pull members 34 and 35 are associated respectively with devices 42 and 43, these devices desirably being counterparts of each other although differently positioned. The casing of one of these devices (42) is broken out to disclose the worm thread (44) and worm thread follower (45) elements therein. The worm thread follower is mounted toward the end of a lever 46 which is keyed to shaft 47, this shaft also carrying the lever 48 externally of the casing, to which the lower end of push-pull member 34 is coupled by means of a universal joint 49. Similar parts are incorporated in the device 43, the external lever 50 of which is shown as being coupled by universal 51 to the lower end of push-pull member 35.

From the above it will be seen that rotation of the worm 44 of either device will effect tilting of the hub through the member 34 or 35.

The worm 44 of the unit 42 is actuated by means of a sprocket 52 (see Figures 2 and 3) engaging a chain 53, the ends of which are connected to cables 54 and 55 riding on pulleys 56 and extended downwardly (see Figures 1 and 4) for connection with an additional section of sprocket chain 57 which rides on a pair of sprockets 58—58', one of which appears in axial section in Figure 6. Each of these sprockets is mounted on a fixed supporting bracket 59 by means of a bearing 60 which permits free rotation of the sprocket but prevents the sprocket from moving axially thereof. The sprocket further carries a diaphragm 61 which is notched as at 62 to engage spiral splines 63 formed on rod or tube 64. This tube 64 is restrained as against rotation by means of straight splines 65 engaging pads 66 which are rigid with the supporting bracket 59.

As best seen in Figure 7, one end of the member 64 projects into tube 67 and is constrained to move longitudinally therewith by screws 68 engaging in an annular groove 69. This arrangement permits relative rotation between the members 64 and 67 but, as aforesaid, provides for longitudinal movement of the two together. Longitudinal movement of member 64 causes rotation of sprocket 58 and this in turn actuates the chain 57 and thus pulls on the cables 54 and 55 to effect rotation of the worm 44 for tilting the hub in the fore and aft plane.

The worm of unit 43 for the lateral control is actuated by sprocket 70 (see Figures 2 and 3) which engages with chain 71 coupled to cables 72 and 73, the latter riding on pulleys 74 and being extended downwardly (see Figures 1 and 4) for connection with the sprocket chain 75 riding on a pair of sprockets 76—76'. These two sprockets, as shown in Figure 5, are mounted in a manner similar to that described above as to sprocket 58. A fixed supporting bracket 77 carries the sprocket for rotation by means of bearings 78. This sprocket is also provided with a diaphragm 79 with a central aperture of angular shape to engage the outside of tube 67. This tube may thus move axially through the sprocket but the sprocket is constrained to rotate with the tube. The tube 67 at one end carries the manually operable hand control wheel 80 which thus provides for control displacements of the hub in both the lateral and the longitudinal planes, the lateral displacement being effected by rotation of the hand wheel and the longitudinal displacement by axial movement of the hand wheel. The various parts of the axis mechanism for the hand wheel and the hand wheel itself are duplicated as at 67', 64' and 80' to provide dual control. The two controls are caused to rotate in unison by virtue of the sprockets 76 and 76' engaging the tubes 67 and 67'. Longitudinal movement of the two controls in unison is effected by means of a figure eight cable connection including cable 81 riding on pulleys 82, the cable being connected with brackets 83 and 83' which are rigid respectively with the control tube elements 64 and 64'.

Before considering certain operational characteristics of the mechanism described, reference is made to Figures 8 and 9 and the modification of the dual control illustrated therein. This modification in many respects resembles that of Figures 4 to 7 and includes a pair of handwheels 80 and 80' mounted for rotation and for axial movement by means of tubes 84 and 84' having an external hexagonal or other angular shape.

In this arrangement, rotation of one of the hand wheels (80 for example) is effective to tilt the rotor hub laterally by imparting movement to the lateral control cables 72a and 73a, which cables ride on pulleys 85 and 85', and are anchored thereto by any suitable attachment device or by being given one or two turns about the pulleys to ensure good frictional engagement. One of these pulleys appears in greater detail in Figure 9 from which it will be seen that it is mounted on a fixed supporting element 86 by means of a bearing 87 through which the control tube 84 may move longitudinally. Rotation of the pulley 85 with the tube 84 is provided for by a plurality of rollers 88 riding on flat surfaces of the member 84. This arrangement reduces friction incident to longitudinal movement of the control member through the pulley.

The longitudinal control displacement of the hub is effected again by means of cables 54a and 55a although the coupling of these cables to the control elements 84 and 84' is arranged differently from that described above in connection with Figure 4. Here the cable 54a rides over pulley 89 and is connected with a bracket 90 which projects from and is carried by a fitting 91 having a rotative connection with the control member 84, although the parts 90 and 91 are constrained to move longitudinally with member 84. Spaced fixed guides 92 cooperating with the projecting bracket 90 serve to prevent rotation of this part during rotation of the hand wheel to effect lateral control. Another cable length 93 is connected with the fitting 91 and passes over pulleys 94 for connection with bracket 90' which is mounted on fitting 91' of construction similar to that described just above. Guides 92' prevent rotation of the parts 90' and 91'.

The other cable 55a which is extended upwardly to the rotor hub passes over pulleys 95 for connection with the fitting 91' thereby completing a closed cable circuit or system causing the two hand wheels to move longitudinally in unison during effecting of longitudinal control displacements of the rotor hub.

In considering the structural and operational characteristics of the foregoing mechanisms, it is first noted that the worm units 42 and 43 provide substantial mechanical advantage for the pilot, this being of importance in facilitating use of tension elements, such as cables, between these units and the control organs themselves. On the other hand, it is convenient and of advantage to employ the short push-pull members 34 and 35 between the units 42 and 43 and the rotor itself.

Referring more particularly to one of the worm units, attention is called to the unit 42 toward the right of Figure 2. As here shown, an intermediate section of the worm thread defined by the portion A of the angular displacement of shaft 47 carrying arms 46 and 48, is of such pitch as to provide an eighteen to one ratio between rotation of the worm and rotation of shaft 47. On the other hand, in the smaller end sections B and C, the worm thread is of such pitch as to provide a ratio of fourteen to one.

It will be understood, of course, that these figures are given only by way of example, although they represent a preferred approximation of the difference contemplated by this invention between the advantage afforded in a central portion of the control range as compared with the end portions thereof.

It will be noted that the high ratio central portion A is not centralized with respect to the entire control range, but is displaced somewhat toward the end thereof (B end) representing forward tilting of the hub. This displacement of the central range has been adopted since in this position it best covers the average position of the controls in normal horizontal translational flight.

As to the lateral unit 43, it is also preferred to employ an intermediate portion of the control range of higher ratio than the end portions, although in this instance the intermediate portions may, if desired, be centered with respect to the entire range.

In either case, the arrangement provides for limited or partial "reversibility" which is different as between the intermediate and the end portions of the control range, and also for a mechanical advantage which is different as between the intermediate portion and the end portions.

I claim:

1. In an aircraft having a bladed sustaining rotor mounted for tilting movement in all directions, control mechanism for moving the rotor to effect a shift in the lift line thereof including a manually operable control wheel mounted for rotation about its axis and for displacement in a generally fore and aft direction, control connections extended from said wheel to the rotor and providing for rotor movement in a sense producing lateral shift of the lift line upon rotation of said wheel, and control connections extended from said wheel to the rotor and providing for rotor movement in a sense producing fore and aft shift of the lift line upon displacement of the wheel, each of said control connections including a device interposed therein and located close to the rotor for transmitting the control movements from the wheel to the rotor and providing mechanical advantage for the operator, said devices including cooperating worm thread and worm thread follower elements, the latter of which in each device is connected with the rotor and the former of which is connected with the wheel, said devices being arranged to provide limited reverse transmission of forces from the rotor to the control wheel.

2. In an aircraft having a bladed sustaining rotor, control mechanism for moving the rotor blades to effect a shift in the lift line of the rotor including a pair of rotative members, tension elements engaging said members and extended therefrom toward the rotor head for moving the rotor blades in senses providing for lateral and longitudinal control, respectively, a manually operable control wheel, an axis member for said wheel axially movable with respect to both of said rotative members, one of said rotative members being rotatable with said axis member and the wheel, and means including spiral tongue and groove parts for connecting the other of said rotative members to the axis member providing for rotation thereof upon displacement of the axis member and wheel.

3. In an aircraft having a bladed sustaining rotor mounted for tilting movement in all directions, means for tilting the rotor to shift the lift line thereof for control purposes including, reversible worm and worm follower devices mounted near the rotor head, connected with the rotor and providing mechanical advantage for the operator, at least one of said devices providing greater mechanical advantage in a central portion of the control range as compared with the end portions thereof, a manually operable control wheel connected with the worm devices, the control wheel being movable in a fore and aft sense to actuate one worm device and effect fore and aft tilting of the rotor, and the control wheel further being movable in a rotational sense to actuate the other worm device to effect lateral tilting of the rotor.

4. In an aircraft having a bladed sustaining rotor mounted for tilting movement in all directions, means for tilting the rotor for control purposes including a pair of arms connected with the rotor, one extending generally laterally and the other generally longitudinally, for each arm a worm and worm follower unit supported near the rotor mounting, the follower unit being connected with the arm to actuate the same, for each worm, a tension connection for actuating the same, a manual control wheel rotatable and axially displaceable, said tension connections being coupled to the control wheel to provide for actuation of one worm and follower unit to effect lateral tilting of the rotor upon rotation of the control wheel, and further to provide for actuation of the other worm and follower unit to effect longitudinal tilting of the rotor upon axial displacement of the control wheel.

5. In an aircraft having a bladed sustaining rotor, means for tilting the rotor for control purposes including a pair of arms connected with the rotor, one extending generally laterally and the other generally longitudinally, rotative devices connected with said arms for actuating the same, tension elements for actuating said rotative devices, a manually rotatable and axially displaceable control shaft, a pair of rotative members associated with the control shaft and both restrained as against axial movement therewith, one of said rotative members being in driving engagement with one of said tension elements and mounted for rotation with the control shaft, the other of said rotative members being in driving engagement with the other of said tension elements, and a spiral spline interconnecting said last rotative member and the control shaft to provide for rotation thereof upon axial displacement of the control shaft, the connections between said rotative devices and the control shaft being such as to provide for control in a fore and aft sense upon axial displacement of the control shaft and for control in a lateral sense upon rotation of the control shaft.

6. In an aircraft having a bladed sustaining rotor, control mechanism for moving the rotor blades to effect a shift in the lift line of the rotor including a manually operable control shaft mounted for rotation and for axial displacement, and control connections between said shaft and the rotor for effecting control movements of the blades, the connections including, for lateral control, tension elements arranged in a closed circuit and a rotative member in driving engagement with a tension element in said circuit, said rotative member being rotatable with the control shaft and the control shaft being axially displaceable with respect to said member, and the control connections including, for pitching control, tension elements arranged in a closed circuit one run of which generally parallels the path of displacement movement of the control shaft, and means interconnecting the control shaft and the tension element in said run.

7. In an aircraft having a bladed sustaining rotor, control mechanism for moving the rotor blades to effect a shift in the lift line of the rotor, and manually operable control means including a pair of control shafts providing for dual control, the shafts being mounted for rotation and for axial displacement, and control connections between said shafts and the rotor for effecting control movements of the blades, the control connections including, for lateral control, tension elements arranged in a closed circuit and a pair of rotative members each in driving engagement with a tension element in said circuit and one associated with one control shaft and the other with the other control shaft, each rotative member being rotatable with its respective control shaft and the control shaft being axially displaceable with respect thereto, and the control connections including, for pitching control, tension elements arranged in a closed circuit and a second pair of rotative members in driving engagement with a tension element in said circuit, the members of said second pair being associated respectively with the two control shafts, and a spiral spline interconnecting each of said second rotative members with its respective control shaft to provide for rotation thereof upon axial displacement of the control shaft, and means constraining said two shafts to move together in the axial sense.

8. In an aircraft having a bladed sustaining rotor, control mechanism for moving the rotor blades to effect a shift in the lift line of the rotor, and manually operable control means including a pair of control shafts providing for dual control, the shafts being mounted for rotation and for axial displacement, and control connections between said shafts and the rotor for effecting control movements of the blades, the control connections including, for lateral control, tension elements arranged in a closed circuit and a pair of rotative members each in driving engagement with a tension element in said circuit and one associated with one control shaft and the other with the other control shaft, each rotative member being rotatable with its respective control shaft and the control shaft being axially displaceable with respect thereto, and the control connections including, for pitching control, tension elements arranged in a closed circuit and having a run generally paralleling the path of displacement movement of one control shaft and another run paralleling the path of movement of the other control shaft, and means interconnecting each control shaft with its parallel run.

9. In an aircraft having a bladed sustaining rotor, control mechanism for moving the rotor blades to effect a shift in the lift line of the rotor including a rotative member, a tension element engaging said member and extended therefrom toward the rotor head for moving the rotor blades in a sense providing for flight control, a manually operable control wheel, an axis member for said wheel at least a portion of which is of polygonal section and which is axially movable with respect to said rotative member, said rotative member having a plurality of roller elements mounted thereon cooperating with the sides of the shaft to support the axis member and the rotative member being rotatable with said axis member and the wheel.

10. In an aircraft having a bladed sustaining rotor, control mechanism for moving the rotor blades to effect a shift in the lift line of the rotor including a manually operable control shaft mounted for rotation and for axial displacement, and control connections between said shaft and the rotor for effecting control movements of the blades, the connections including, for lateral control, tension elements arranged in a closed circuit and a rotative member in driving engagement with a tension element in said circuit, said rotative member being rotatable with the control shaft and having a plurality of roller elements mounted thereon adapted to cooperate with the shaft to support the same, and the control shaft being axially displaceable with respect to said member, and the control connections including, for pitching control, tension elements arranged in a closed circuit one run of which generally parallels the path of displacement movement of the control shaft, and means interconnecting the control shaft and the tension element in said run.

11. In an aircraft having a tiltably mounted sustaining rotor, mechanism for controllably tilting the rotor to effect a shift in the lift line thereof including two reversible worm devices coupled to the rotor, one device providing for tilting in the fore and aft sense for pitching control, and the other for tilting in the lateral sense for lateral control, a shaft mounted for rotation and for axial displacement, connections between said shaft and the worm devices for effecting control movements of the blades, the connections including, for lateral control, tension elements arranged in a closed circuit and a rotative member in driving engagement with a tension element in said circuit, said rotative member being rotatable with said shaft and the shaft being axially displaceable with respect thereto, and the connections further including, for pitching control, tension elements arranged in a closed circuit and having a run generally paralleling the path of axial displacement movement of the control shaft, and means interconnecting the control shaft with said parallel run.

12. In an aircraft having a bladed sustaining rotor and fuselage structure; means for attaching the rotor to the fuselage structure including a rotative hub member tiltable in any direction and a non-rotative ring journaled on and tiltable with the hub member, control mechanism coupled with the ring for tilting the rotor to effect a shift in the lift line thereof for attitude control purposes, said mechanism including: a manually operable control organ in the fuselage movable in two senses to effect lateral and longitudinal control of the craft, a pair of reversible worm devices located near the rotor hub and having relatively short and rigid connecting members extended to said ring, control connections between the worm devices and the manual control organ, and mounting means for said worm devices rigidly connecting said devices with fuselage structural elements whereby to transfer loads originating in the rotor directly to said structure and thereby relieve the last mentioned connections of at least a major portion of said loads originating in the rotor.

13. In an aircraft having a bladed sustaining rotor and fuselage structure; means for attaching the rotor to the fuselage structure including a rotative hub member tiltable in any direction and a non-rotative ring journaled on and tiltable with the hub member, control mechanism coupled with the ring for tilting the rotor to effect a shift in the lift line thereof for attitude control purposes, said mechanism including: a manually operable control organ movable in two senses to effect lateral and longitudinal control of the craft, a pair of reversible worm devices located near the rotor hub and having relatively short and rigid connecting members between the worm devices and the ring, control connections between the worm devices and the manual control organ including chain and sprocket driving elements for said worm devices, and mounting means for said worm devices rigidly connecting said devices with fuselage structural elements whereby to transfer loads originating in the rotor directly to said structure and thereby relieve the last mentioned connections of at least a major portion of said loads originating in the rotor.

14. In an aircraft having a bladed sustaining rotor and fuselage structure, means for attaching the rotor to the fuselage structure including a rotative hub member tiltable in any direction, mechanism for controllably tilting the rotor to effect a shift in the lift line of the rotor, said mechanism including: a ring journaled on the hub, a manually operable control organ in the fuselage, two reversible worm devices located near the rotor hub and connected for actuation by said control organ, rigid connection members pivotally interconnecting the worm devices and said ring, and means for restraining rotation of said ring including flexible linkage having one end fixed to the rotor supporting structure and the other end universally coupled to said ring.

15. In an aircraft having a sustaining rotor, a rotatively and tiltably mounted rotor hub, and mechanism for controlling tilting the hub in all directions including a ring journaled on the hub, a pair of push-pull elements for tilting said ring and thereby said hub, and flexible joint means connecting said elements with said ring at points angularly spaced from each other approximately 90°, the flexible joint means for each of said elements serving to accommodate tilting movements of the ring under the influence of push-pull action of the other element.

16. In an aircraft having a sustaining rotor, a rotatively and tiltably mounted rotor hub, and mechanism for controllably tilting the hub in all directions including a ring journaled on the hub, a pair of push-pull elements for tilting said ring and thereby said hub, flexible joint means connecting said elements with said ring at points angularly spaced from each other approximately 90°, the flexible joint means for each of said elements serving to accommodate tilting movements of the ring under the influence of push-pull action of the other element, and means for restraining said ring as against rotation with the rotor including jointed linkage connected with the ring through the flexible joint means for one of said push-pull members.

AGNEW E. LARSEN.